US008954052B2

United States Patent
Huang et al.

(10) Patent No.: US 8,954,052 B2
(45) Date of Patent: Feb. 10, 2015

(54) METHOD AND SYSTEM FOR IMPLEMENTING MEASUREMENT

(75) Inventors: Yada Huang, Shenzhen (CN); Zhongming Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 339 days.

(21) Appl. No.: 13/147,356

(22) PCT Filed: Jul. 28, 2009

(86) PCT No.: PCT/CN2009/072957
§ 371 (c)(1),
(2), (4) Date: Aug. 1, 2011

(87) PCT Pub. No.: WO2010/088814
PCT Pub. Date: Aug. 12, 2010

(65) Prior Publication Data
US 2011/0287767 A1 Nov. 24, 2011

(30) Foreign Application Priority Data
Feb. 3, 2009 (CN) .......................... 2009 1 0077917

(51) Int. Cl.
*H04W 24/00* (2009.01)
*H04L 12/26* (2006.01)
(52) U.S. Cl.
CPC ............ *H04L 12/2602* (2013.01); *H04L 43/00* (2013.01)
USPC ....................................................... 455/423
(58) Field of Classification Search
CPC .............................. H04W 24/00; H04W 24/10
USPC ........................................................ 455/423
See application file for complete search history.

(56) References Cited

U.S. PATENT DOCUMENTS

| 6,445,917 | B1 * | 9/2002 | Bark et al. ..................... 455/423 |
| 8,121,589 | B2 * | 2/2012 | Fischer et al. ................. 455/423 |
| 8,260,736 | B1 * | 9/2012 | Lear et al. ........................ 706/46 |
| 8,385,920 | B2 * | 2/2013 | Iwamura ........................ 455/437 |
| 2001/0051971 | A1 * | 12/2001 | Kato ............................. 709/102 |

(Continued)

FOREIGN PATENT DOCUMENTS

| CA | 2273782 A1 | 2/2000 |
| CN | 1582039 A | 2/2005 |

(Continued)

OTHER PUBLICATIONS

International Search Report in international application No. PCT/CN2009/072957, mailed on Nov. 12, 2009.
English translation of the Written Opinion of the International Search Authority in international application No.: PCT/CN2009/072957, mailed on Nov. 12, 2009.

*Primary Examiner* — Nathan Mitchell
(74) *Attorney, Agent, or Firm* — Patterson Thuente Pedersen, P.A.

(57) ABSTRACT

The present invention discloses a method and system for implementing measurement. The method comprises: a report status of a measurement task is detected, a User Equipment (UE) no longer measures the current measurement task if the report status is that the current measurement task has been finished or will not continue being reported, or the User Equipment (UE) continues measuring the current measurement task if the report status is that the current measurement task is not finished or will continue being reported. By adopting the present invention, the UE is free from unnecessary measurements when the reporting of the measurement task is not needed, which relieves the measurement burden of the UE.

16 Claims, 3 Drawing Sheets

(56) References Cited

U.S. PATENT DOCUMENTS

| | | |
|---|---|---|
| 2002/0007300 A1* | 1/2002 | Slatter ............................ 705/9 |
| 2008/0130584 A1 | 6/2008 | Pani et al. |
| 2008/0167026 A1* | 7/2008 | Eckert et al. ............... 455/418 |
| 2008/0207195 A1* | 8/2008 | Ranta et al. ................ 455/423 |
| 2009/0005029 A1* | 1/2009 | Wang et al. ................. 455/423 |
| 2009/0247150 A1* | 10/2009 | Fischer et al. ............. 455/425 |
| 2010/0062800 A1* | 3/2010 | Gupta et al. .............. 455/552.1 |
| 2010/0159950 A1* | 6/2010 | Toh et al. ................. 455/456.1 |
| 2010/0285806 A1* | 11/2010 | Iwamura .................... 455/437 |
| 2011/0081868 A1* | 4/2011 | Kim et al. ................ 455/67.11 |

FOREIGN PATENT DOCUMENTS

| | | |
|---|---|---|
| CN | 101312408 A | 11/2008 |
| JP | 2001054153 A | 2/2001 |
| JP | 2008-533895 | 8/2008 |
| RU | 2310293 C2 | 11/2007 |
| WO | WO 2008/020729 | 2/2008 |
| WO | WO 2008/054775 A2 | 5/2008 |
| WO | WO 2008/082347 | 7/2008 |
| WO | WO 2008/087535 A2 | 7/2008 |
| WO | WO 2008/157800 A1 | 12/2008 |

* cited by examiner

METHOD AND SYSTEM FOR IMPLEMENTING MEASUREMENT

The present application is a National Phase entry of PCT Application No. PCT/CN2009/072957, filed Jul. 28, 2009, which claims priority from Chinese Application No. 200910077917.0, filed Feb. 3, 2009, the disclosures of which are hereby incorporated by reference herein in their entirety.

TECHNICAL FIELD

The present invention relates to a measurement technology, and more particularly, to an optimized method and system for implementing measurement.

BACKGROUND

Cell reselection and cell handover are important functions of a mobile communication system. In order to achieve a smooth cell reselection, a User Equipment (UE) needs to measure signal quality of different cells so as to select a proper cell for camp. In order to meet the demand on mobility, after being connected with a network in a cell, the UE still needs to measure signal quality of neighboring cells to select a proper cell for a handover. During a measurement, a network side in a connected state sends a measurement control message to a UE, and the UE needs to send a measurement report according to the content in the measurement control message. Here, the content encapsulated in the measurement control message comprises: a Measurement Object (MO), measurement report configuration information (Report Configuration, RC), a Measurement ID (MID), a measurement threshold (s-Measure), measurement quality configuration and measurement interval configuration; wherein the MO may be a frequency, a group of frequencies or a group of cells on one or more frequencies; the RC is used for configuring attributes of a measurement report, for example, event-triggered reporting or periodically-triggered reporting as well as the configuration corresponding to each report type; the MID is an identifier which corresponds to a specific measurement task and associates one MO with one RC; the s-Measure is a measurement threshold value of signal quality of the cell where the UE currently camps; the measurement quality configuration is used for indicating specific measurement quality; and the measurement interval configuration is used for configuration information such as differ-frequency measurement.

It should be noted that the measurement task involved in a measurement can be explained as a measurement task constituted by an MO and RC corresponding to an MID, for example, an MO corresponding to MID 1 is frequency A and corresponding RC is that: if there exists a cell on the frequency A with signal quality greater than s-Measure, the reporting of the measurement is triggered by an event, then a measurement task is performed. An MID is used for identifying a configured measurement task so that a UE can know the number of the configured measurement tasks by calculating the number of the configured MIDs, and the attributes of the measurement task, for example, an MO (frequency A or frequency B) and a report type of a measurement (periodically-triggered reporting or event-triggered reporting), can be obtained through the MO and RC corresponding to the MID. After receiving a measurement control message, the UE stores configuration content associated with the measurement in its own variables, for example, in a variable VarMeasConfig for storing measurement-related configuration content including a configured MO list, an RC list, an MID list as well as s-Measure, a measurement quality configuration and a measurement interval, etc.

In the 3rd mobile communication Long-Term Evolution (LTE) system, a UE can perform a measurement according to the following measurement rule.

For each configured MID (namely, each MID stored in a measurement configuration variable), if a measurement interval is needed by and configured for an MO corresponding to an MID and the necessary measurement condition is met that a value of signal measurement quality of the cell where the UE camps is less than configured s-Measure or no s-Measure is configured, then the UE performs a measurement on the MO corresponding to the MID.

That is, after the necessary condition is met, if radio quality of the serving cell is good enough, i.e., the value of the signal measurement quality of the cell where the UE camps is greater than the s-Measure, the UE performs no measurement, thus reducing the measurement times of the UE; or if a special measurement interval is needed for a different-frequency MO measurement but there exists no measurement interval, the UE performs no measurement but always measures other MIDs.

Measurement reporting is classified into event-triggered reporting and periodically-triggered reporting. The reporting of a measurement is triggered by an event when the following condition is met: first, signal measurement quality of an MO corresponding to an MID is measured, and then, a measurement is triggered only when the signal measurement quality of the MO meets a event-triggered reporting condition, for example, the event-triggered reporting condition is that an event is triggered when measured radio signal quality of a neighboring cell is 3 db higher than that of the cell where the UE camps. The reporting is performed only once or many times at a given time interval. FIG. 1 is a schematic diagram illustrating the reporting of a measurement triggered by an event, as shown in FIG. 1, after receiving a measurement control message from a network side, a UE sends a measurement report many times in an event-triggered reporting manner at a reporting interval after an event is triggered. For the periodically-triggered reporting, measurement reporting is started once a report number is acquired and performed at a report interval, the difference from the situation in event-triggered reporting lying in that in this case the reporting is started without meeting the event-triggered reporting condition. FIG. 2 is a schematic diagram illustrating the reporting of a measurement triggered periodically, as shown in FIG. 2, after receiving a measurement control message from a network side, a UE sends a measurement report many times in a periodically-triggered reporting manner at a report interval. In order to save network resources, the report time of the periodically-triggered reporting can be limited by setting a maximum report time, i.e., a periodical measurement is configured by the network side for the UE, the UE creates a node measurement report VarMeasReport in its own measurement report list variable, for example, VarMeasReportList, every time the reporting of a measurement task is started, wherein the measurement report list variable, which is presented in the form of a list or an array, is only used for storing an MID and a report counting value corresponding to the MID, and each node measurement report in the measurement report list variable, i.e., VarMeasReport, takes the MID as its keyword, wherein the report counting value of the current measurement task is stored in each measurement report node, the report counting value is increased by 1 every time reporting is performed, and the reporting is ended when the report counting value is accumulated to a given report time, i.e., the accumulated report counting value is equal to the set maximum report time. The measurement report node in the measurement report list variable which takes an MID as its keyword is cleaned when the MID, the MO or RC corresponding to the MID is re-configured, and all the nodes in the measurement report list variable are cleaned when a handover or a reestablishment is performed.

The prior art is disadvantaged in that based on existing measurement rules, a UE continues measuring an MO corresponding to an MID even after the reporting of a measurement report is ended, and that the UE is always powered during the measurement, thus increasing the power consumption and other resource consumption of the UE. At present, no effective solutions have been proposed to resolve the above problem.

SUMMARY

On this ground, the present invention is disclosed mainly for providing a method and system for implementing measurement, which can implement measurement and free a UE from unnecessary measurement, thereby reducing the power consumption and other resource consumption of the UE.

In order to achieve the above purpose, the technical scheme of the present invention is realized as follows.

A method for implementing measurement comprises: detecting a report status of a measurement task, if a current measurement task has been finished or will not continue being reported, a User Equipment (UE) no longer measures the current measurement task; or if the current measurement task is not finished or will continue being reported, the UE continues measuring the current measurement task.

Wherein, a measurement object of the measurement task may be cells on one or a group of frequencies corresponding to the measurement task.

Wherein, the measurement task, which will continue being reported or is not finished, may be not required to be detected but always measured.

Wherein, the measurement task may be a measurement task reported in manner of event-triggered reporting.

Wherein, the method may further comprise:

A1, initially setting a status corresponding to an identifier of the current measurement task, the report status of the measurement task identified by the status is RUNNING; according to the identified report status of the measurement task, the UE continues measuring cells on one or a group of frequencies indicated by a measurement object corresponding to the identifier of the current measurement task if it is detected that the report status of the current measurement task is that the current measurement task is not finished or will continue being reported; and A2, determining that a report type corresponding to the identifier of the current measurement task is periodically-triggered reporting and updating the identified report status of the measurement task to be FINISH when a report accounting value is equal to or greater than and equal to a set maximum report time; according to the updated identified report status of the measurement task, the UE no longer measures the cells on one or a group of frequencies indicated by the measurement object corresponding to the current measurement task if it is detected that the report status of the current measurement task is that the current measurement task has been finished or will not continue being reported.

Wherein, a status of each identifier corresponding to each measurement task may be initially set when the UE is subjected to an initial measurement configuration, a measurement reconfiguration, a handover or a connection reestablishment, a report status of a measurement task identified by the status being RUNNING; and when the current measurement task has been finished, the report status of the measurement task identified by the status corresponding to the current identifier of the current measurement task may be updated to be FINISH.

Wherein, the method may further comprise:

B1, detecting the report status of the current measurement task according to the result of a determination on a measurement report corresponding to an identifier of the current measurement task in a measurement report list; if the result of the current determination is that the UE finds no measurement report corresponding to the identifier of the current measurement task, or the report type of the identifier of the current measurement task is event-triggered reporting, or the report type of the identifier of the current measurement task is periodically-triggered reporting and the UE finds a measurement report corresponding to the identifier of the current measurement in which a report accounting value is less than a set maximum report time, then the report status of the current measurement task is that the current measurement task is not finished or will continue being reported, and the UE continues measuring cells on one or a group of frequencies indicated by an measurement object corresponding to the identifier of the current measurement task;

if the result of the current determination is that the report type of the identifier of the current measurement task is periodically-triggered reporting and the UE finds a measurement report corresponding to the identifier of current measurement task in which the report accounting value is equal to or greater than and equal to the set maximum report time, then the report status of the current measurement task is that the current measurement task has been finished or will not continue being reported, and the UE no longer measures cells on one or a group of frequencies indicated by the measurement object corresponding to the identifier of the current measurement task; and B2, always storing the measurement report corresponding to the identifier of the current measurement task in the measurement report list.

Wherein, B2 may further comprise: always storing, even when the report status of the measurement task is that the measurement task has been finished or will not continue being reported, the measurement report corresponding to the identifier of the current measurement task in the measurement report list unless the UE is subjected to a measurement reconfiguration, a handover or a connection reestablishment.

Wherein, the method may further comprise: ending a measurement on cells on one or a group of frequencies indicated by a measurement object corresponding to the identifier of a measurement task associated with periodically-triggered reporting after the reporting of a periodical measurement report is triggered by the identifier of the measurement task and the report accounting value in the measurement report is not less than the set maximum report time.

A system for implementing measurement comprises: a detection unit and a measurement strategy processing unit, wherein the detection unit is used for detecting a report status of a measurement task;

the measurement strategy processing unit is used for stopping a measurement performed by a UE on a current measurement task when the detection unit detects that the report status of the current measurement task is that the current measurement task has been finished or will not continue being reported; or the measurement strategy processing unit is used for enabling the UE to continue measuring a current measurement task when the detection unit detects that the report status of the current measurement task is that the current measurement task is not finished or will continue being reported.

A method for implementing measurement comprises: deleting a measurement task by a UE after a report status of the measurement task is changed to FINISH from UNFINISH.

Wherein the step of deleting a measurement task may further refer to deleting the MID of the measurement task from a variable VarMeasurementConfiguration.

Wherein, the method may further comprise: setting the report status of the measurement task to be UNFINISH if a periodical measurement report is triggered by an MID associated with periodically-triggered reporting and the report accounting value in the measurement report is less than a set maximum report time; and setting the report status of the measurement task to be FINISH if the report accounting value in the measurement report is equal to or greater than and equal to the set maximum report time and ending the measurement on cells on one or a group of frequencies indicated by a Measurement Object (MO) corresponding to the associated MID.

Wherein, the method may further comprise: deleting the MID corresponding to the periodically-triggered reported measurement task when the UE is subjected to a handover or a reestablishment.

A system for implementing measurement comprises: a deletion unit for a UE to delete a measurement task after a report status of the measurement task is changed to FINISH from UNFINISH.

Wherein the deletion unit may be further used for deleting the MID of the measurement task from a variable VarMeasurementConfiguration.

In the present invention, a report status is associated with a measurement task to detect a current report status of a current measurement task, and a UE processes an MO of the current measurement task using a corresponding measurement strategy. Specifically, the UE no longer measures the current measurement task if it is detected that the report status of the current measurement task is that: the current measurement task has been finished or will not continue being reported, or the UE continues measuring the current measurement task if it is detected that the report status of the current measurement task is that: the current measurement task is not finished or will continue being reported.

As for a measurement task of periodically-triggered reporting, the UE will no longer report the measurement report of the MID to a network side after the report accounting value has been accumulated to a given one, then it is unnecessary for the UE to measure cells on one or a group of frequencies indicated by the MO corresponding to the MID. In the prior art, it is not considered, in a measurement based on existing measurement rules, whether the measurement can be finally reported, for example, a UE will continue performing unnecessary measurement on cells on the one or a group of frequencies indicated by the MO corresponding to the MID even after a measurement report reported in manner of periodically-triggered reporting is ended, thus increasing unnecessary energy consumption of the UE. However, in the present invention, a report status is associated with a measurement task so that the MO of the measurement task is processed using different measurement strategies, for example, in the case where a current report status is that a current measurement task has been finished or will not continue being reported, a corresponding measurement strategy of stopping the measurement performed by the UE on the MO of the current measurement task is adopted. By adopting the present invention, the UE is prevented from implementing unnecessary measurement when the reporting of a measurement task is not needed, therefore, the measurement burden of the UE is relieved.

DETAILED DESCRIPTION

The basic idea of the present invention is as follows: a current report status of a current measurement task is detected by associating a report status with a measurement task, and then a UE processes an MO of the current measurement task using a corresponding measurement strategy, wherein the corresponding measurement strategy is that the UE no longer measures the current measurement task when the current report status is that the current measurement task has been finished or will not continue being reported; and the UE continues measuring the current measurement task when the current report status is that the current measurement task is not finished or will continue being reported.

The implementation of the technical scheme is described below in detail by reference to drawings.

Figure 1:
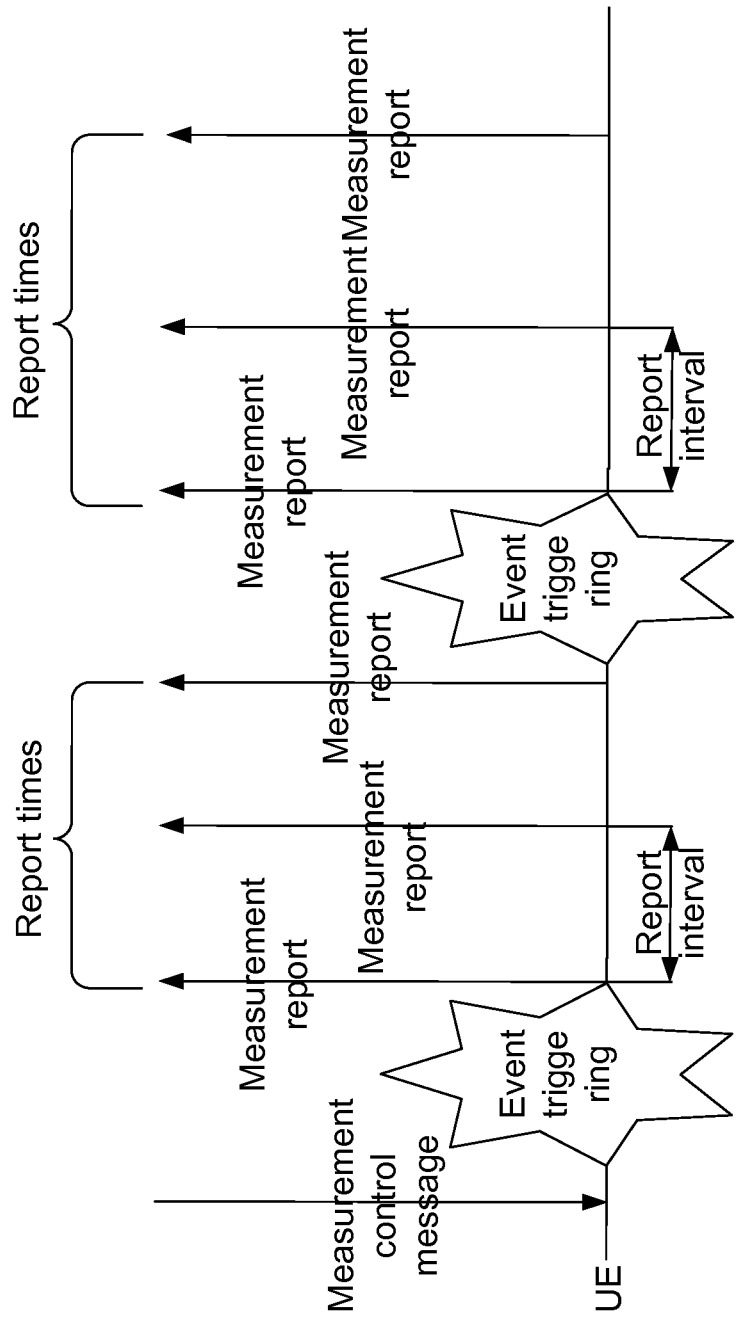
FIG. 1 is a schematic diagram illustrating the reporting of a measurement triggered by an event.
Figure 2:
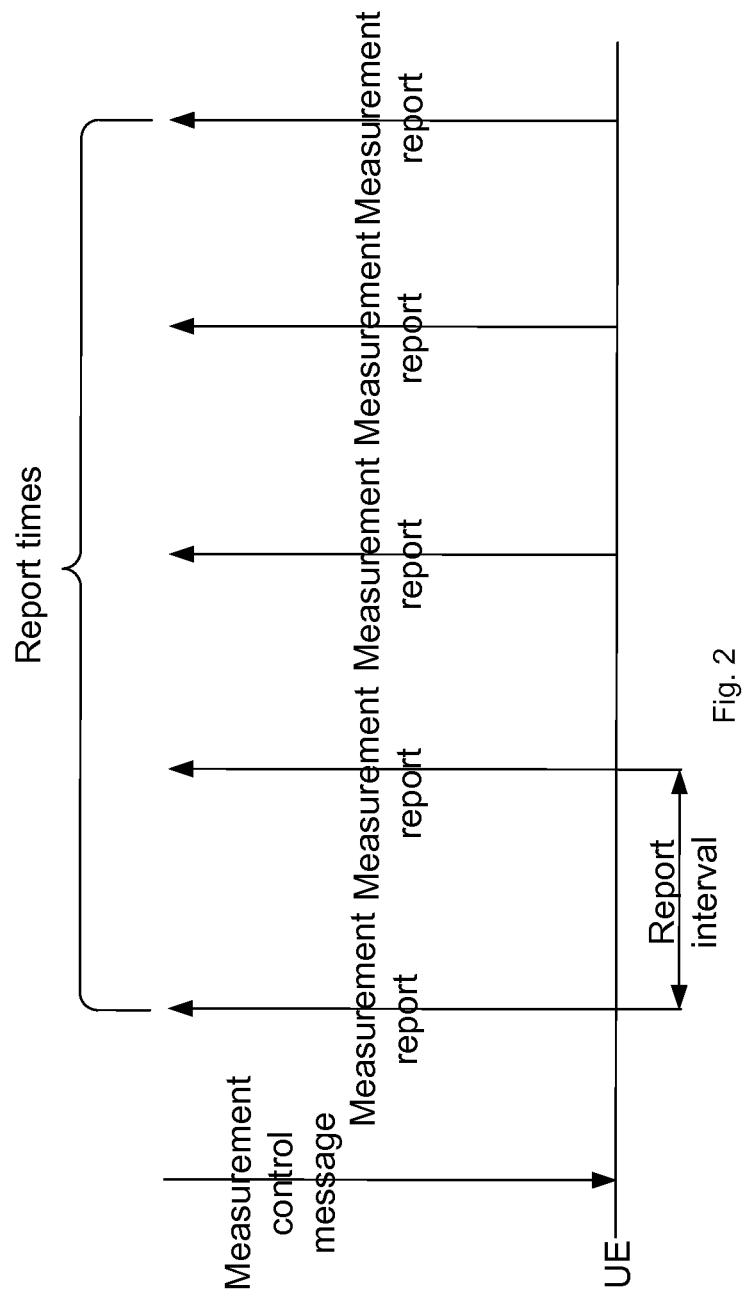
FIG. 2 is a schematic diagram illustrating the reporting of a measurement triggered periodically.
Figure 3:
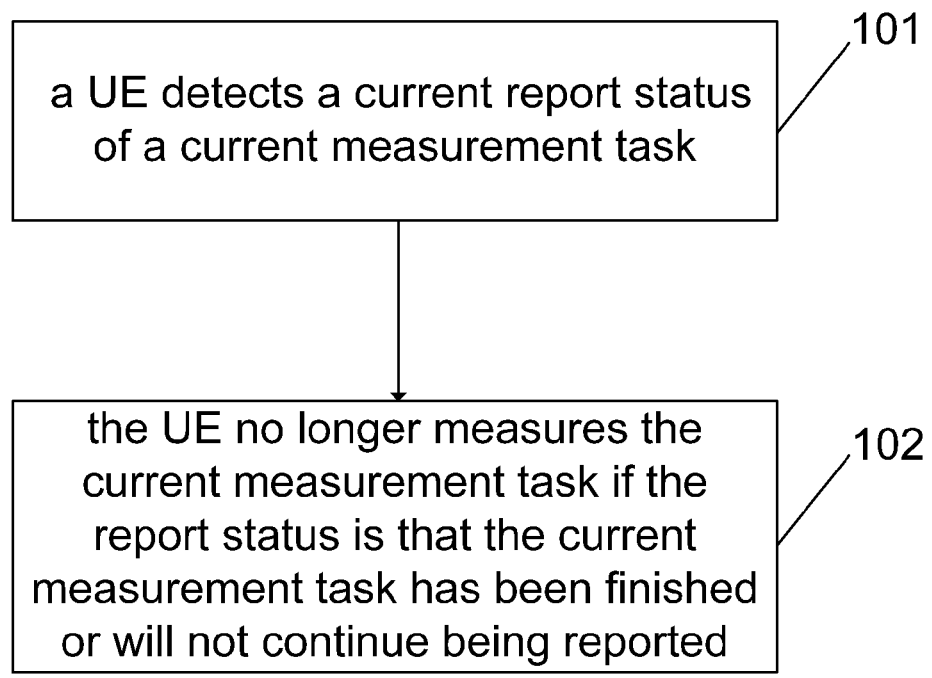
FIG. 3 is a schematic diagram illustrating an implementing flow of a method according to an embodiment of the present invention.

The present invention provides two solutions, the first one is specifically implemented in two ways. As for the first solution of the present invention, FIG. 3 is a schematic diagram illustrating an implementing flow of a method according to an embodiment of the present invention, as shown in FIG. 3, a method for implementing measurement comprises the following steps.

Step 101: a UE detects a current report status of a current measurement task.

Step 102: the UE no longer measures the current measurement task if the report status is that the current measurement task has been finished or will not continue being reported.

Here, step 102 may be step 102a that the UE continues measuring the current measurement task if the report status is that the current measurement task is not finished or will continue being reported.

Here, the MO of the measurement task is cells on one or a group of frequencies indicated by the MO corresponding to the measurement task.

Here, the measurement task that will continue being reported or is not finished may be not required to be detected but always measured. The measurement task may be a measurement task reported in manner of event-triggered reporting.

Here, for the method for implementing measurement comprising steps 101 to 102, that is, if it is detected that the report status of the current measurement task is that the current measurement task has been finished or will not continue being reported, the following measurement strategy is adopted: the UE no longer measures cells on one or a group of frequencies indicated by the MO of the measurement task corresponding to the current report status; and for the method for implementing measurement comprising steps 101 to 102a, that is, if it is detected that the report status of the current measurement task is that the current measurement task is not finished or will continue being reported, the following measurement strategy is adopted: the UE continues measuring cells on one or a group of frequencies indicated by the MO of the measurement task corresponding to the current report status. Below is the detailed description on the specific processing of the method for implementing measurement in different cases.

In the first case, the specific processing of the method for implementing measurement comprises the following steps.

Step 201: a variable STATUS corresponding to an MID of a current measurement task is initially set, wherein the variable STATUS may be also called a report status identifier, and the report status of the measurement task identified by the variable STATUS is RUNNING, i.e., STATUS=RUNNING; the report status of the current measurement task is detected according to the report status of the measurement task identified by the variable STATUS; and a UE processes an MO of the current measurement task using a corresponding measurement strategy.

Step 202: the report status of the measurement task identified by the variable STATUS is updated to be FINISH, i.e., the setting is updated to be STATUS=FINISH, when the report type corresponding to the current MID is determined to be periodically-triggered reporting and a report counting value is determined not to be less than a set maximum report time; the report status of the current measurement task is detected according to the report status of the measurement task identified by the updated variable STATUS; and the UE processes the MO of the current measurement task using a corresponding measurement strategy.

Here, an MO of a corresponding measurement task specifically refers to cells on one or a group of frequencies indicated by the MO corresponding to the current MID. In step 201, if the report status of the current measurement task detected according to the report status of the measurement task identified by the variable STATUS is that the current measurement task is not finished or will continue being reported, then the corresponding measurement strategy is that the UE continues measuring cells on one or a group of frequencies indicated by the MO corresponding to the current MID. In step 202, if the report status of the current measurement task detected according to the report status of the measurement task identified by the updated variable STATUS is that the current measurement task has been finished or will not continue being reported, then the corresponding measurement strategy is that the UE no longer measures cells on one or a group of frequencies indicated by the MO corresponding to the current MID.

Moreover, for each MID corresponding to each measurement task, it is initially set to be STATUS=RUNNING when the UE is subjected to an initial measurement configuration, a measurement reconfiguration, a handover or a connection reestablishment; and the variable STATUS corresponding to the current MID corresponding to the current measurement task is updated and set to be STATUS=FINISH when the current measurement task has been finished.

It should be noted that the specific processing of the measurement implementation scheme further comprises: ending a measurement on cells on one or a group of frequencies indicated by an MO corresponding to an MID associated with periodically-triggered reporting after the reporting of a periodical measurement report is triggered by the MID and a report accounting value is equal to or greater than and equal to a set maximum report time.

In a second case, the specific processing of the method for implementing measurement comprises the following steps.

Step 301: a report status of a current measurement task is detected according to the result of a related determination on a node corresponding to a current MID in a variable VarMeasurementReports; and a UE processes an MO of the current measurement task using a corresponding measurement strategy.

Here, the MO of the corresponding measurement task refers to cells on one or a group of frequencies indicated by the MO corresponding to the current MID. Specifically, step 301 comprises the following processing: if the result of the current determination is that the UE finds no node corresponding to the current MID, or the report type of the current MID is event-triggered reporting, or the report type of the current MID is periodically-triggered reporting and the UE finds a node corresponding to the current MID in which a report accounting value is less than a set maximum report time, the report status of the current measurement task is that the current measurement task is not finished or will continue being reported, then the corresponding measurement strategy is that the UE continues measuring the cells on one or a group of frequencies indicated by the MO corresponding to the current MID; or if the result of the current determination is that the report type of the current MID is periodically-triggered reporting and the UE finds a node corresponding to the current MID in which a report accounting value is equal to or greater than and equal to a set maximum report time, the report status of the current measurement task is that the current measurement task has been finished or will not continue being reported, then the corresponding measurement strategy is that the UE no longer measures the cells at one or a group of frequencies indicated by the MO corresponding to the current MID.

Step 302: the node corresponding to the current MID in the variable VarMeasurementReports is always stored.

Here, step 302 further comprises: continuing storing, even after the measurement task has been finished or will not continue being reported, the node corresponding to the current MID in the variable VarMeasurementReports unless the UE is subjected to a measurement reconfiguration, a handover or a connection reestablishment.

It should be noted that the specific processing of the measurement implementation scheme further comprises: ending a measurement on cells on one or a group of frequencies indicated by an MO corresponding to an MID associated with periodically-triggered reporting after the reporting of a periodical measurement report is triggered by the MID and a report accounting value is equal to or greater than and equal to a set maximum report time.

A system for implementing measurement comprises a detection unit and a measurement strategy processing unit, wherein the detection unit is used for detecting a report status of a measurement task, and the measurement strategy processing unit is used for stopping a measurement performed by a UE on a current measurement task if the detection unit detects that the report status of the current measurement task is that the current measurement task has been finished or will not continue being reported, or for enabling the UE to continue measuring the current measurement task if the detection unit detects that the report status of the current measurement task is that the current measurement task is not finished or will continue being reported.

As for the second solution of the present invention, a method for implementing measurement comprises: a UE deletes a measurement task after a report status of the measurement task is changed to FINISH from UNFINISH, specifically, the specific processing comprises the following steps.

Step 401: a UE measures each MO corresponding to each MID in a variable VarMeasurementConfiguration.

Step 402: the UE deletes an MID of a measurement task in the variable VarMeasurementConfiguration when a report status of the measurement task is changed to FINISH from UNFINISH.

Here, the specific processing of the method for implementing measurement further comprises: setting the report status of the measurement task to UNFINISH if the reporting of a periodical measurement report is triggered by an MID associated with periodically-triggered reporting and a report accounting value is less than a set maximum report time; and setting the report status of the measurement task to FINISH if a report accounting value is equal to or greater than and equal to a set maximum report time and ending the measurement on cells on one or a group of frequencies indicated by the MO corresponding to the MID.

Here, the method further comprises: deleting the MID corresponding to the measurement task reported in manner of periodically-triggered reporting, when the UE is subjected to a handover or a reestablishment.

A system for implementing measurement comprises a deletion unit which is used for deleting a measurement task performed by a UE after a report status of the measurement task is changed to FINISH from UNFINISH.

Here, the deletion unit is further used for deleting the MID of the measurement task in a variable VarMeasurementConfiguration.

The following three examples are based on such a configuration that: in an LTE system, a UE camps on frequency A where a serving cell S1 is located, a value of signal measurement quality of the serving cell S1 being $s_A$, and a network side sends a measurement control message to the UE when the UE is in a connected state, wherein the measurement control message contains: MO1 which is set to be LTE cells on the frequency A; RC1 which is set to be event-triggered reporting triggered by an event when signal quality of a neighboring cell is 2 db higher than that of the cell where the UE camps; and MID1 corresponding to the MO1 and the RC1; MO2 which is LTE cells on frequency B; RC2 which is set to be periodically-triggered reporting of a reportStrongestCells type, i.e., the cells with strongest signal measurement quality in the MO2 are reported; a maximum report time and a report interval; and MID2 corresponding to the MO2 and the RC2; a measurement threshold which is set to be s-Measure; and a measurement interval is configured. Blow is detailed description on examples 1, 2 and 3.

EXAMPLE 1 in addition to the variable VarMeasurementReports, a variable STATUS is added to identify a report status of a measurement task so as to facilitate a report status detection based on the report status of the measurement task identified by the variable STATUS, a current report status can be thereby detected based on the report status of the measurement task identified by the variable STATUS, and a UE can process an MO of the measurement task corresponding to the current report status using a corresponding measurement strategy. There are provided two measurement strategies, one is that the UE no longer measures the MO of the current measurement task when the report status of the current measurement task is that the current measurement task has been finished or will not continue being reported, and another is that the UE continues measuring the MO of the current measurement task when the report status of the current measurement task is that the measurement task is not finished or will continue being reported.

It should be noted that, the variable VarMeasurementReports can be presented in the form of a list which indicates an index relation between an MID and a report accounting value of the current measurement task and takes the MID as its index keyword and in which MIDs and corresponding report accounting values are contained. When the variable VarMeasurementReports is presented in the form of an array, array data in the array include: MIDs used as array keywords, and a report accounting value corresponding to an MID.

In this example, as the MID2 is associated with periodically-triggered reporting, there exists a definite status FINISH for periodically-triggered reporting after a fixed report period is finished, the UE initially sets the variable STATUS of the MID2 associated with periodically-triggered reporting to RUNNING. As the MID1 is associated with event-triggered reporting, i.e. triggered by an event, there exists no definite status FINISH for event-triggered reporting, the UE may initially set the variable STATUS of the MID1 to RUNNING, or not set only specifying that a check on a report status of event-triggered reporting is not performed during the measurement.

Specifically, all the MIDs in the variable VarMeasurementReports are traversed when the UE performs a measurement. For the MID1, the UE measures all the LTE cells on the frequency A when $s_A <$s-Measure or no s-Measure is configured. For the MID2, the UE measures all the LTE cells on the frequency B when $s_A <$s-Measure or a measurement interval instead of s-Measure is configured. It can be seen from the above that the UE measures an MO corresponding to an MID as long as a necessary measurement condition is met, that is, the $s_A$ of the cell where the UE camps is less than a configured s-Measure, or no s-Measure is configured.

For the MID2 associated with periodically-triggered reporting, the method for implementing measurement comprises the following steps.

Step 501: a report status of a measurement task identified by a variable STATUS corresponding to the MID2 is initially set to RUNNING, a report status of a current measurement task is detected according to the identified report status of the measurement task, and a UE processes an MO of the current measurement task using a corresponding measurement strategy.

Here, as an MID corresponds to a measurement task, the MO of the corresponding measurement task is MO2 corresponding to the MID2.

Here, the setting is initially set to STATUS=RUNNING, i.e., the report status of the measurement task identified by the variable STATUS is RUNNING, to indicate that the current measurement task is running and not finished yet. Then, it is detected, based on the identified report status of the measurement task, that the report status of the current measurement task is as follows: the current measurement task is not finished or will continue being reported; and the corresponding measurement strategy is that the UE continues measuring the MO2 associated with the MID2, i.e., cells on frequency B. After detecting cells on the frequency B, the UE reports the cells with strongest radio quality to an Evolved Node B (eNB) according to the measurement value from maximum to minimum.

Additionally, the report accounting value corresponding to the MID2 in the variable VarMeasurementReports is increased by 1 every time the reporting has been finished when the UE performs a measurement task.

Step 502: the report status of the measurement task identified by the variable STATUS is updated to be FINISH when it is determined that the report accounting value corresponding to the MID2 is equal to a set maximum report time, and the report status of the current measurement task is detected according to the report status of the measurement task identified by the updated variable STATUS; and the UE processes the MO of the current measurement task using a corresponding measurement strategy.

Here, when the report accounting value is equal to or greater than and equal to the set maximum report time, the MID2 is updated and set to STATUS=FINISH, i.e., the report status of the measurement task identified by the variable STATUS is updated to be FINISH to indicate the completion of the current measurement task. Then it is detected, based on the report status of the measurement task identified by the update variable STATUS, that the report status of the current measurement task is that the current measurement task has been finished or will not continue being reported, and the corresponding measurement strategy is that the UE no longer measures the MO2 associated with the MID2, i.e., the cells on the frequency B.

Step 503: a node corresponding to the MID2 in the variable VarMeasurementReports is cleaned.

Here, the cleaning of a node corresponding to the MID2 in the variable VarMeasurementReports may be the cleaning of the record of an item corresponding to an index keyword MID2 when the variable VarMeasurementReports is presented in the form of a list, or the cleaning of array data corresponding to an array keyword MID2 when the variable VarMeasurementReports is presented in the form of an array.

Here, when the UE performs another detection before a measurement, for the MID2, as the MID2 is associated with a measurement reported in a periodically-triggered reporting manner, the variable STATUS corresponding to the MID2 needs checking when $s_A$<s-Measure or no s-Measure is configured, so that the report status of the current measurement task can be detected based on the report status of the measurement task identified by the variable STATUS. Then, it will be found that STATUS=FINISH, and the UE will measure the frequency A corresponding to the MO1 rather than the LTE cells on the frequency B corresponding to the MO2.

When the UE is subjected to a measurement reconfiguration, there exists, not limited to, the following cases. Case 1: the MO2 corresponding to the MID2 is re-configured to be frequency C while the corresponding RC2 is unchanged. Case 2: the RC2 corresponding to the MID2 is reconfigured to be one type of periodically-triggered reporting, i.e., a measurement is reported in manner of periodically-triggered reporting, reportStrongestCellsForSON. Case 3: both MO2 and RC2 are reconfigured. And case 4: the variable STATUS corresponding to the MID2 is reset to RUNNING from FINISH when the MID 2 is reconfigured so as to continue the measurement on a new measurement task. In the case of a measurement reconfiguration, for an MID associated with periodically-triggered reporting, the method for implementing measurement used by the UE in a measurement can also be adopted, i.e., the variable STATUS corresponding to the MID is initially set and updated, and the report status of the current measurement task is detected according to the report status of the measurement task identified by the variable STATUS.

When the UE is subjected to a handover or a reestablishment, there exists, not limited to, the following cases: the variable STATUS corresponding to the MID2 is reset to RUNNING from FINISH so that the UE can perform another measurement after a handover even if no reconfigured measurement is provided during a non-handover process. In a handover, for an MID associated with periodically-triggered reporting, the method for implementing measurement used by the UE in a measurement can also be adopted, i.e., the variable STATUS corresponding to the MID is initially set and updated, and the report status of the current measurement task is detected according to the report status of the measurement task identified by the variable STATUS.

EXAMPLE 2 a running condition of a current measurement task can be known via an existing variable VarMeasurementReports, without adding a variable STATUS for identifying a report status of a measurement task; a report status of the current measurement task can be detected only via the variable VarMeasurementReports, i.e., for an MID corresponding to a periodically-triggered reported measurement in the variable VarMeasurementReports, a determination can be made on whether to measure the measurement task by directly determining whether the report accounting value in a node corresponding to the MID in the variable VarMeasurementReports is less than, equal to, or greater than and equal to a set maximum report time. Thus, the report status of the current measurement task is detected based on the variable VarMeasurementReports, and the UE processes, using a corresponding measurement strategy, an MO of the current measurement task corresponding to the report status of the current measurement task. Moreover, after the current measurement task has been finished, i.e., the report accounting value in the node corresponding to the current MID in the variable VarMeasurementReports is equal to or greater than and equal to the set maximum report time, the node corresponding to the current MID in the variable VarMeasurementReports is not cleaned, i.e., the MID and the report accounting value corresponding to the MID are stored in the variable VarMeasurementReports.

Specifically, all the MIDs in the variable VarMeasurementReports are traversed when the UE performs a measurement. For the MID2, the UE measures all the LTE cells on the frequency A when $s_A$<s-Measure or no s-Measure is configured. For the MID2, the UE measures all the LTE cells on the frequency B when $s_A$<s-Measure or when a measurement interval, instead of an s-Measure, is configured. It can be seen from the above that the UE measures an MO corresponding to an MID as long as a necessary measurement condition is met, i.e., the $s_A$ of the cell where the UE camps is less than the configured s-Measure, or no s-Measure is configured.

For the MID2 associated with periodically-triggered reporting, the method for implementing measurement comprises the following steps.

Step 601: a report status of a current measurement task is detected according to the result of a related determination on a node in the variable VarMeasurementReports corresponding to the MID2; and the UE processes an MO of a current measurement task using a corresponding measurement strategy.

Here, as an MID corresponds to a measurement task, the MO of the corresponding measurement task is MO2 corresponding to the MID2.

Here, the UE searches for nodes corresponding to the MID2 in the variable VarMeasurementReports and makes a determination; if the result of the current determination is that a node corresponding to the MID2 is not found, or the report type of the current MID is event-triggered reporting, or the report type of the current MID is periodically-triggered reporting and the UE finds a node corresponding to the MID2 in which the report accounting value is less than a set maximum report time, it is detected that the report status of the current measurement task is that the current measurement task is not finished or will continue being reported, and the corresponding measurement strategy is that the UE considers the measurement task unfinished and continues measuring the MO2 associated with the MID2, i.e., the cells on the frequency B.

Furthermore, when the UE performs a measurement task, the report accounting value corresponding to the MID2 in the variable VarMeasurementReports is increased by 1 every time a report has been finished. The UE continues searching for a node corresponding to the MID2 in the variable VarMeasurementReports and makes a determination; if the result of the current determination is that the report type of the current MID is periodically-triggered reporting and the UE finds a node corresponding to the MID2 in which the report accounting value is equal to or greater than and equal to the set maximum report time, then it is detected that the report status of the current measurement task is that the current measurement task has been finished or will not continue being reported, and the corresponding measurement strategy is that the UE stops reporting and continuing measuring the MO2 associated with the MID2, i.e., the cells on the frequency B.

Step 602: nodes corresponding to the MID2 in the variable VarMeasurementReports are always stored. i.e., nodes corresponding to the MID2 in the variable VarMeasurementReports are not cleaned, which means that the record of an item taking the MID2 as its index keyword is not cleaned when the variable VarMeasurementReports is presented in the form of a list, or that array data taking the MID2 as its array keyword is not cleaned if the variable VarMeasurementReports is presented in the form of an array.

Here, when the UE performs another detection before a measurement, for the MID2, if $s_A$<s-Measure or if a measurement interval instead of an s-Measure is configured, as the nodes corresponding to the MID2 in the variable VarMeasurementReports are stored, it can be known, through a determination on the node corresponding to the MID2 in the variable VarMeasurementReports, that the report accounting value in a node corresponding to the MID2 is equal to or greater than and equal to the set maximum report time, and the measurement report reported by the UE is not needed any more, then the UE will only measure the frequency A corresponding to the MO1 rather than the cells on the frequency B corresponding to the MO2.

When the UE is subjected to a measurement reconfiguration, there exists, not limited to, the following cases. Case 1: the MO2 corresponding to the MID2 is re-configured to be frequency C while RC2 is unchanged. Case 2: the RC2 corresponding to the MID2 is reconfigured to be a measurement reported in manner of periodically-triggered reporting, reportStrongestCellsForSON. Case 3: both MO2 and RC2 are reconfigured. And case 4: each node corresponding to the MID2 in the variable VarMeasurementReports is cleaned when the MID2 is reconfigured so that the UE can measure a new measurement task.

When the UE is subjected to a handover or a reestablishment, all the nodes in the variable VarMeasurementReports will be cleaned so that the UE can measure a new measurement task, that is, the UE can perform the measurement task on all MIDs in a new cell.

EXAMPLE 3 no variable STATUS for identifying a report status of a measurement task is added; an MID configuration is deleted by the UE after a measurement task has been finished, i.e., for a periodical measurement task, after the report accounting value of a node corresponding to an MID in an existing variable VarMeasurementReports is equal to or greater than the maximum report time, then the measurement of the measurement task corresponding to the MID is ended since the MID cannot be traversed during the measurement.

When the UE is subjected to a handover or a reestablishment, in a measurement task associated with periodically-triggered reporting, a corresponding MID in a variable VarMeasurementConfiguration is deleted. And for an eNB, the UE is required to be reconfigured and an MID is required to be added for a re-start of the measurement task when the measurement reported in manner of periodically-triggered reporting has been finished and stopped.

Specifically, when the UE performs a measurement, all the MIDs in an existing variable of the UE, namely the variable VarMeasurementConfiguration, are traversed. For the MID1, the UE measures all the LTE cells on the frequency A when $s_A$<s-Measure or no s-Measure is configured. For the MID2, the UE measures all the LTE cells on the frequency B when $s_A$<s-Measure or a measurement interval instead of an s-Measure is configured. It can be seen from the above that the UE measures an MO corresponding to an MID as long as a necessary measurement condition is met, that is, the $s_A$ of the cell where the UE camps is less than the configured s-Measure, or no s-Measure is configured.

For the MID2 associated with periodically-triggered reporting, the method for implementing measurement comprises the following steps.

Step 701: the UE measures all the MOs corresponding to the MIDs in the variable VarMeasurementConfiguration, i.e., the UE searches the variable VarMeasurementConfiguration for an MID list and continues measuring the MO2 associated with the MID2, i.e., the cells on the frequency B if the MID2 is found.

Additionally, when the UE performs a measurement task, a report accounting value corresponding to the MID2 in the variable VarMeasurementReports is increased by 1 every time the reporting has been finished. The UE stops reporting when the report accounting value corresponding to the MID2 is equal to or greater than and equal to the set maximum report time.

Step 702: the UE deletes automatically the MID2 from the MID list in the variable VarMeasurementConfiguration and cleans the nodes corresponding to the MID2 in the variable VarMeasurementReports when the report status of the measurement task is changed to FINISH from UNFINISH.

Wherein the cleaning of the nodes corresponding to the MID2 in the variable VarMeasurementReports may be the cleaning of the record of an item corresponding to an index keyword MID2 when the variable VarMeasurementReports is presented in the form of a list, or the cleaning of array data corresponding to an array keyword MID2 if the variable VarMeasurementReports is presented in the form of an array.

Here, as the MID2 in the variable VarMeasurementConfiguration has been deleted, the UE will measure the frequency A corresponding to the MO1 but not the LTE cells on the frequency B corresponding to the MO2 during a detection before a next measurement.

In the case where the UE is subjected to a handover or a reestablishment, the corresponding MID2 in the variable VarMeasurementConfiguration is automatically deleted for a measurement task associated with a periodically-triggered report.

If an eNB desires to start a periodical measurement task with MID2 again, by subjecting the UE to a measurement reconfiguration, the MID2 is added to the MID list in the variable VarMeasurementConfiguration again when the MID2 is added and reconfigured, then the UE can measure the MO corresponding to the MID2 again.

Apparently, it should be understood by those skilled in the art that the modules or steps of the invention can be realized by a universal computer, centralized in a single computer or distributed in a network consisting of multiple computers, and optionally realized by computer-executable program codes; the modules or steps can be therefore stored in a storage device to be executed by a computer or separately manufactured into integrated circuit modules, or some of the modules or steps are manufactured into a single integrated circuit module. Thus, the invention is not limited to any special combination of hardware and software.

The mentioned above is only preferred embodiments of the invention but not limitation to the invention, various modifications and variations can be devised by those skilled in the art, and it should be understood that any modification, equivalent substitute and improvement made without departing from the spirit and scope of the invention belong to the protection scope of the invention.

What is claimed is:

1. A method for implementing measurement comprising: detecting, by a User Equipment (UE) a report status of a measurement task;
    initially setting a status corresponding to an identifier of a current measurement task, the report status of the measurement task identified by the status being RUNNING; according to the identified report status of the measurement task, the UE continuing measuring cells on one or a group of frequencies indicated by a measurement object corresponding to the identifier of the current measurement task if it is detected that the report status of the current measurement task is that the current measurement task is not finished or will continue being reported;
    determining that a report type corresponding to the identifier of the current measurement task is periodically-triggered reporting and updating the identified report status of the measurement task to be FINISH when a report accounting value is equal to or greater than and equal to a set maximum report time; according to the updated identified report status of the measurement task, the UE no longer measuring the cells on one or a group of frequencies indicated by the measurement object corresponding to the current measurement task if it is detected that the report status of the current measurement task is that the current measurement task has been finished or will not continue being reported;
    stopping, by the UE, performance of the current measurement task if the report status of the measurement task is that the current measurement task has been finished or will not continue being reported or
    continuing, by the UE, performance of the current measurement task if the report status of the measurement task is that the current measurement task is not finished or will continue being reported.

2. The method according to claim 1, wherein a measurement object of the measurement task is cells on one or a group of frequencies corresponding to the measurement task.

3. The method according to claim 1, wherein the measurement task, which will continue being reported or is not finished, is not required to be detected but always measured.

4. The method according to claim 3, wherein the measurement task is a measurement task reported in a manner of event-triggered reporting.

5. The method according to claim 1, wherein a status of each identifier corresponding to each measurement task is initially set when the UE is subjected to an initial measurement configuration, a measurement reconfiguration, a handover or a connection reestablishment, a report status of a measurement task identified by the status being RUNNING; and
    when the current measurement task has been finished, the report status of the measurement task identified by the status corresponding to the current identifier of the current measurement task is updated to be FINISH.

6. The method according to claim 1, further comprising:
    detecting the report status of the current measurement task according to the result of a determination on a measurement report corresponding to an identifier of the current measurement task in a measurement report list; if the result of the current determination is that the UE finds no measurement report corresponding to the identifier of the current measurement task, or the report type of the identifier of the current measurement task is event-triggered reporting, or the report type of the identifier of the current measurement task is periodically-triggered reporting and the UE finds a measurement report corresponding to the identifier of the current measurement in which a report accounting value is less than a set maximum report time, then the report status of the current measurement task being that the current measurement task is not finished or will continue being reported, and the UE continuing measuring cells on one or a group of frequencies indicated by an measurement object corresponding to the identifier of the current measurement task;
    if the result of the current determination is that the report type of the identifier of the current measurement task is periodically-triggered reporting and the UE finds a measurement report corresponding to the identifier of current measurement task in which the report accounting value is equal to or greater than and equal to the set maximum report time, then the report status of the current measurement task being that the current measurement task has been finished or will not continue being reported, and the UE no longer measuring cells on one or a group of frequencies indicated by the measurement object corresponding to the identifier of the current measurement task; and
    always storing the measurement report corresponding to the identifier of the current measurement task in the measurement report list.

7. The method according to claim 6, wherein always storing the measurement report corresponding to the identified of the current measurement task in the measurement report list further comprises: always storing, even when the report status of the measurement task is that the measurement task has been finished or will not continue being reported, the measurement report corresponding to the identifier of the current measurement task in the measurement report list unless the UE is subjected to a measurement reconfiguration, a handover or a connection reestablishment.

8. The method according to claim 1, further comprising: ending a measurement on cells on one or a group of frequencies indicated by a measurement object corresponding to the identifier of a measurement task associated with periodically-triggered reporting after the reporting of a periodical measurement report is triggered by the identifier of the measurement task and the report accounting value in the measurement report is not less than the set maximum report time.

9. A system for implementing measurement, comprising a detection unit and a measurement strategy processing unit, the detection unit and a measurement strategy processing unit are implemented by one or more processors, wherein
- the detection unit is configured to detect a report status of a measurement task;
- the measurement strategy processing unit is configured to stop a measurement performed by a UE on a current measurement task when the detection unit detects that the report status of the current measurement task is that the current measurement task has been finished or will not continue being reported; or
- the measurement strategy processing unit is configured to continue performing the current measurement task when the detection unit detects that the report status of the current measurement task is that the current measurement task is not finished or will continue being reported;
- wherein when a status corresponding to an identifier of the current measurement task is initially set, the report status of the measurement task identified by the status is RUNNING; the detection unit is configured to detect a report status of the current measurement task according to the identified report status of the measurement task; the measurement strategy processing unit is configured to continue measuring cells on one or a group of frequencies indicated by a measurement object corresponding to the identifier of the current measurement task if the detection unit detects that the report status of the current measurement task is that the current measurement task is not finished or will continue being reported; and
- when a report type corresponding to the identifier of the current measurement task is periodically-triggered reporting and a report accounting value is equal to or greater than and equal to a set maximum report time, the identified report status of the measurement task is updated to be FINISH; the detection unit is configured to detect a report status of the current measurement task according to the updated identified report status of the measurement task; the measurement strategy processing unit is configured to no longer measuring the cells on one or a group of frequencies indicated by the measurement object corresponding to the current measurement task if the detection unit detects that the report status of the current measurement task is that the current measurement task has been finished or will not continue being reported.

10. A method for implementing measurement, comprising: deleting, by a UE, a measurement task after a report status of the measurement task is changed to FINISH from UNFINISH;
- wherein setting the report status of the measurement task to be UNFINISH if a periodic measurement report is triggered by an MID associated with periodically-triggered reporting and the report accounting value in the measurement report is less than a set maximum report time;
- setting the report status of the measurement task to be FINISH if the report accounting value in the measurement report is equal to or greater than and equal to the set maximum report time and ending the measurement on cells on one or a group of frequencies indicated by a Measurement Object (MO) corresponding to the associated MID; and
- deleting the MID corresponding to the periodically-triggered reported measurement task when the UE is subjected to a handover or a reestablishment.

11. The method according to claim 10, wherein the step of deleting a measurement task further refers to deleting the MID of the measurement task from a variable VarMeasurementConfiguration.

12. A system for implementing measurement, comprising;
- a deletion unit configured to delete a measurement task by a UE after a report status of the measurement task is changed to FINISH from UNFINISH;
- wherein the deletion unit is implemented by one or more processors;
- setting the report status of the measurement task to be UNFINISH ,if a periodic measurement report is triggered by a MID associated with periodically-triggered reporting and the report accounting value in the measurement report is less than a set maximum report time; and
- setting the report status of the measurement task to be FINISH if the report accounting value in the measurement report is equal to or greater than and equal to the set maximum report time and ending the measurement on cells on one or a group of frequencies indicated by a Measurement Object (MO) corresponding to the associated MID;
- the deletion unit is further configured to delete the MID corresponding to the periodically-triggered reported measurement task when the UE is subjected to a handover or a reestablishment.

13. The system according to claim 12, wherein the deletion unit is further used for deleting the MID of the measurement task from a variable VarMeasurementConfiguration.

14. The method according to claim 5, further comprising: ending a measurement on cells on one or a group of frequencies indicated by a measurement object corresponding to the identifier of a measurement task associated with periodically-triggered reporting after the reporting of a periodical measurement report is triggered by the identifier of the measurement task and the report accounting value in the measurement report is not less than the set maximum report time.

15. The method according to claim 6, further comprising: ending a measurement on cells on one or a group of frequencies indicated by a measurement object corresponding to the identifier of a measurement task associated with periodically-triggered reporting after the reporting of a periodical measurement report is triggered by the identifier of the measurement task and the report accounting value in the measurement report is not less than the set maximum report time.

16. The method according to claim 7, further comprising: ending a measurement on cells on one or a group of frequencies indicated by a measurement object corresponding to the identifier of a measurement task associated with periodically-triggered reporting after the reporting of a periodical measurement report is triggered by the identifier of the measurement task and the report accounting value in the measurement report is not less than the set maximum report time.

* * * * *